United States Patent
Noguchi et al.

(10) Patent No.: US 7,336,652 B2
(45) Date of Patent: Feb. 26, 2008

(54) DATA COMMUNICATION APPARATUS AND DATA COMMUNICATION METHOD

(75) Inventors: Yoshihiro Noguchi, Kanagawa (JP); Genzo Takagi, Saitama (JP); Motoyasu Ohno, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 895 days.

(21) Appl. No.: 10/696,029

(22) Filed: Oct. 30, 2003

(65) Prior Publication Data

US 2005/0041644 A1 Feb. 24, 2005

(30) Foreign Application Priority Data

Aug. 5, 2003 (JP) ............................. 2003-286357

(51) Int. Cl.
*H04L 12/66* (2006.01)
(52) U.S. Cl. ...................................... 370/352; 370/493
(58) Field of Classification Search ................ 370/352, 370/493; 358/442–444
See application file for complete search history.

(56) References Cited

U.S. PATENT DOCUMENTS 6,829,244 B1 * 12/2004 Wildfeuer et al. .......... 370/412

FOREIGN PATENT DOCUMENTS

JP      11-88533      3/1999

OTHER PUBLICATIONS

English Language Abstract of JP 11-88533. Mar. 30, 1999.

* cited by examiner

*Primary Examiner*—Stella Woo
(74) *Attorney, Agent, or Firm*—Greenblum & Bernstein, P.L.C.

(57) ABSTRACT

According to the data amount stored in a jitter buffer, which temporarily stores obtained data from a received voice packet, an operation timing of an output process of the jitter buffer and a data process of a codec and a modem is adjusted, the codec and the modem processing data that is sequentially output from the jitter buffer.

10 Claims, 3 Drawing Sheets

DATA COMMUNICATION APPARATUS AND DATA COMMUNICATION METHOD

BACKGROUND OF THE INVENTION

1. Field of the Invention

The present invention relates to a data communication apparatus and a data communication method that communicate by storing non-voice data in a voice packet, in a voice communication system that dialogues by exchanging voice packets via an IP network.

2. Description of Related Art

In recent years, so-called VoIP (Voice over Internet Protocol) communication system has rapidly become available. The VoIP dialogues by exchanging voice packets via an IP network. In addition, an IP telephone adaptor apparatus has been introduced, the apparatus enabling the continued use of an ordinary PSTN telephone in the VoIP communication system. The IP telephone adaptor apparatus enables a PSTN data communication apparatus (such as facsimile apparatus) to utilize the VoIP communication system.

The VoIP communication system includes a jitter buffer in a receiver, in order to buff the fluctuation of intervals between packet arrivals, the fluctuation being caused by delays within the IP network. Further, the VoIP communication system does not retransmit data to ensure the real-time voice reproduction. Therefore, when there is an overflow within the jitter buffer, the data is destroyed. When there is an underflow, the data is interpolated based on the data immediately before (see Related Art 1).

[Related Art 1]

Japanese Patent Laid Open Publication H11-88533

The above-described data destruction and interpolation during the overflow and underflow periods is effective for ensuring a quality telephone communication. However, such data destruction and interpolation should be avoided for facsimile data communication, since they may lower the communication quality by interfering an accurate data reproduction.

Since the fluctuation of intervals between packet arrivals, due to the delays within the IP network, is non-cumulative, the fluctuation can be absorbed by the capacity of the buffer to a certain degree. However, when the changes in the data amount stored in the buffer are cumulative, the jitter buffer cannot absorb the fluctuation by itself.

In particular, a slight difference in speed between the clock generators of the sender and receiver sides can cause a deviation of mutual process timings at both sides. For example, when the process timing of the sender side is faster than the one of the receiver side, the jitter buffer at the receiver side will gradually accumulate data, causing an overflow at the end. Conversely, when the process timing of the sender side is slower than the one of the receiver side, the jitter buffer at the receiver side will gradually lose data, causing an underflow at the end. These overflow and underflow problems, caused by the deviation of the mutual process timings, cannot be solved by the limited capacity of the buffer. Furthermore, it is not practical to largely increase the capacity of the buffer, since the manufacturing cost will also need to be increased.

SUMMARY OF THE INVENTION

The present invention is provided to address the above-described problems. The main purpose of the present invention is to provide a data communication apparatus and a data communication method that are configured to enable an accurate data reproduction by securely avoiding overflows and underflows within the jitter buffer.

As a solution to the above-described problems, the present invention provides, as illustrated in claim 1, a data communication apparatus that communicates by storing non-voice data in a voice packet, in a voice communication system that dialogues by exchanging voice packets via an IP network. The data communication apparatus includes a memory that temporarily stores data obtained from a received voice packet, data processor that performs a necessary process on data that is to be sequentially output, and controller that adjusts operation timings of the output process of the memory and the data process of the data processor.

According to the present invention, a risky state having a potential of an overflow/underflow in the memory can be restored to a safe state. Therefore, it is possible to securely prevent the overflow/underflow in the memory and avoid destruction and interpolation of the voice frames. Thus, the data can be accurately reproduced.

It is preferable to employ a lossless voice encoding method, such as the ITU-T recommended G. 711.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
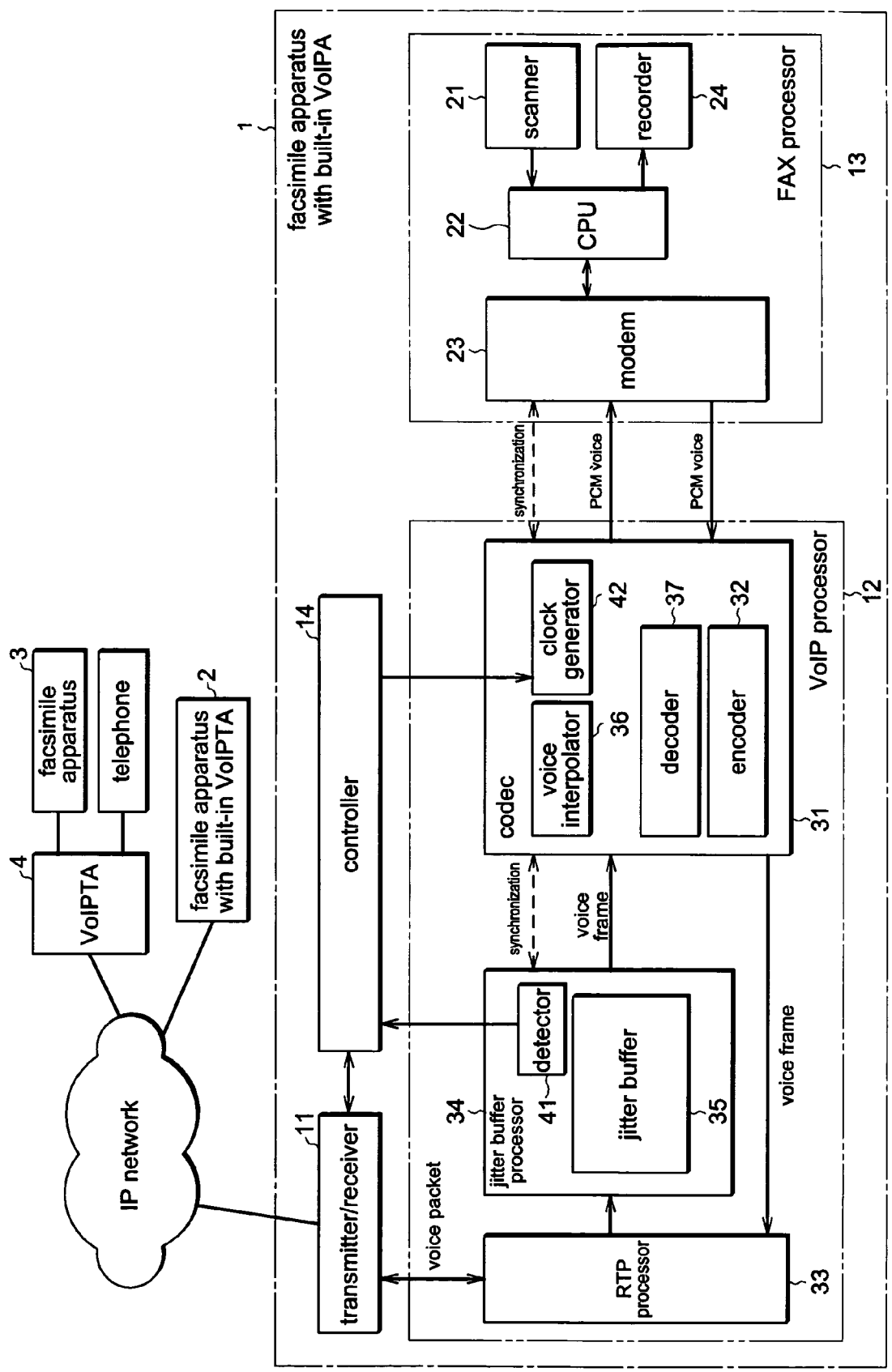
FIG. 1 is a block diagram illustrating a facsimile apparatus with a built-in IP telephone adaptor according to an embodiment of a data communication apparatus of the present invention.

FIG. 1 is a block diagram illustrating a facsimile apparatus with a built-in IP telephone adaptor according to an embodiment of a data communication apparatus of the present invention. In the VoIP communication system that dialogues by exchanging voice packets via the IP network, facsimile apparatus 1 stores facsimile data in a voice packet and performs a deemed voice communication with facsimile apparatus 2 having the same configuration as facsimile apparatus 1, or with IP telephone adaptor apparatus (VoIPA) 4, to which a conventional facsimile apparatus 3 is connected. Facsimile apparatus 1 includes transmitter/receiver 11, VoIP processor 12, facsimile processor 13, and controller 14.

Upon transmitting data from facsimile apparatus 1, image data, generated when scanner 21 (of facsimile processor 13) scans the transmitting document, is input into modem 23 via CPU 22. Modem 23 converts the facsimile data into PCM voice data according to the G3 facsimile communication protocol. The PCM voice data is first encoded by encoder 32 of codec 31 (of VoIP processor 12), according to the regulated voice encoding method of the ITU-T recommended G. 711. Then, the data is built into a voice packet according to the RTP (Real-time Transport Protocol) by RTP processor 33, and transmitted to the IP network via transmitter/receiver 11.

Transmitter/receiver 11 receives, from the IP network, the voice packet in which the facsimile data is stored. Then, RTP processor 33 (of VoIP processor 12) disassembles the packet according to the RTP, and analyses the data to determine the exchange of the packets. A voice frame output from RTP processor 33 is temporarily stored in jitter buffer 35 of jitter buffer processor 34 and sequentially output to codec 31. Codec 31 performs voice frame interpolation at voice interpolator 36 and decoding process at decoder 37, and outputs the PCM voice data. The PCM voice data is then transmitted to facsimile processor 13 and demodulated at modem 23. Then, the obtained image data is recorded on a recording media (such as paper) by recorder 24.

Codec 31 operates with a standard clock generated by internal clock generator 42, so that the output process of the voice frame at jitter buffer 35 is synchronized with the standard clock of clock generator 42. Also, codec 31 and modem 23 are digitally connected to each other so that modem 23 can synchronize with the standard clock of clock generator 42 within codec 31 and perform the coding/decoding process. The clock generator 42 can adjust the timing of clock signal generation, in accordance with the control signal of controller 14. Accordingly, the operation timing of the output process of jitter buffer 35 and the data process of codec 31 and modem 23 is adjusted.

The operation timing of controller 14 is adjusted in accordance with the size of data amount stored in jitter buffer 35. In particular, jitter buffer processor 34 includes detector 41 that detects a buffer full state and a buffer empty state. In the buffer full state, the data amount stored in jitter buffer 35 exceeds a predetermined upper limit. In the buffer empty state, the data mount stored in jitter buffer 35 falls short of a predetermined lower limit. When the buffer full state is detected by detector 41, the operation timing of the output process of jitter buffer 35 and data process of codec 31 and modem 23 are accelerated. When the buffer empty state is detected by detector 41, the operation timing of the output process of jitter buffer 35 and data process of codec 31 and modem 23 are decelerated.

Figure 2A:
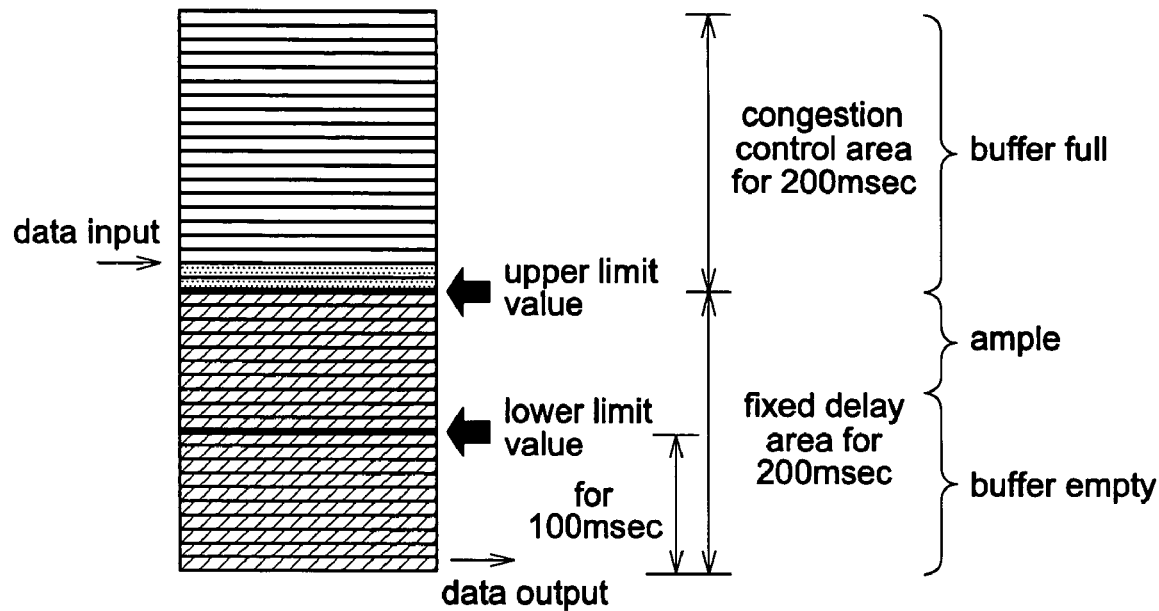
FIGS. 2A and 2B are schematic diagrams illustrating the jitter buffer of FIG. 1.
Figure 2B:
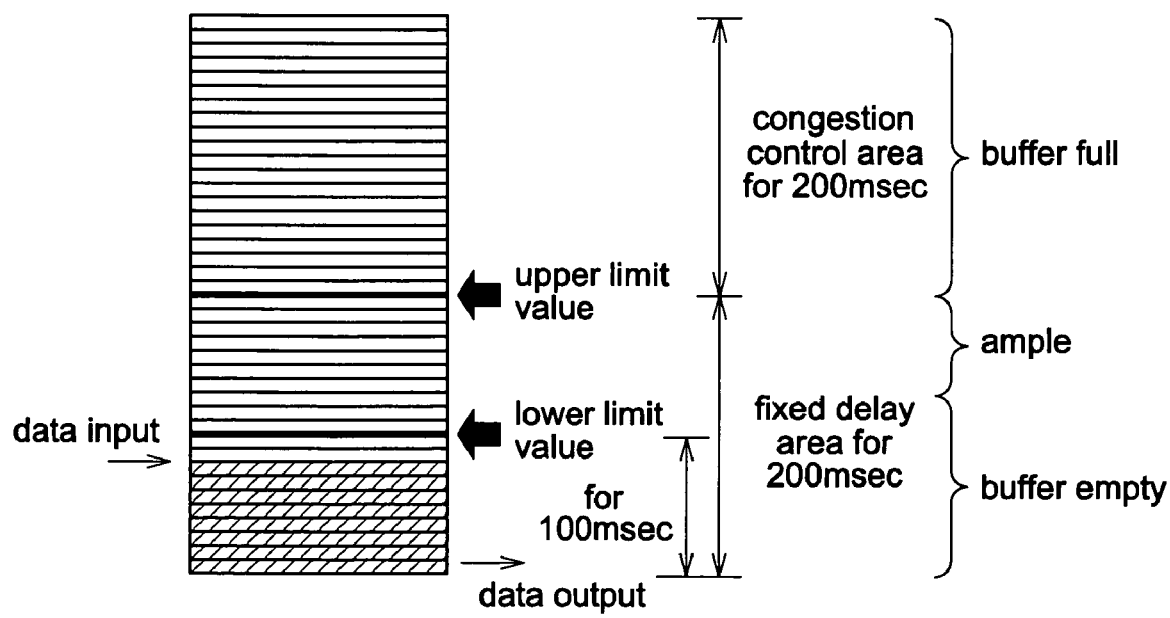

FIG. 2 is a schematic diagram of the jitter buffer of FIG. 1. FIG. 2(A) illustrates the buffer full state, while FIG. 2(B) illustrates the buffer empty state. As jitter buffer 35 sequentially outputs the stored voice frames from the very bottom of the buffer, each voice frame moves downward. A newly input voice frame is stored on the very top of the stored data. Jitter buffer 35 has a fixed delay area for a predetermined capacity (e.g., 200 msec) that absorbs the fluctuation of intervals between packet arrivals (due to the delay within the IP network), and the delay in the packet exchanges at RTP processor 33. When the data reaches the upper limit of the fixed delay area, the data exchange with codec 31 starts.

In addition, jitter buffer processor 34 sets the upper limit value (first threshold value), which is used by detector 41 to detect the buffer full state, at the upper limit of the fixed delay area. Jitter buffer 35 includes a congestion control area, above the fixed delay area, for a predetermined capacity (e.g., 200 msec) that handles a situation in which a cluster of packets stagnant at a router (due to a congested network) arrive in a very short period. Jitter buffer processor 34 sets the lower limit value (second threshold value), which is used by detector 41 to detect the buffer empty state, at a predetermined value (e.g., 100 msec) of the fixed delay area.

Figure 3A:
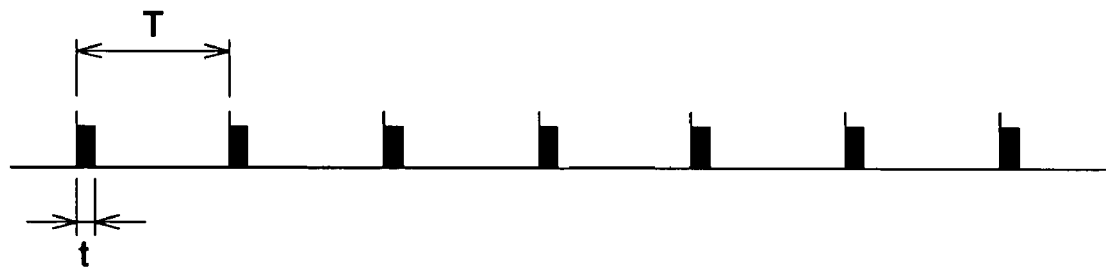
FIGS. 3A, 3B, and 3C are timing charts illustrating a data process at the facsimile apparatus of FIG. 1.
Figure 3B:
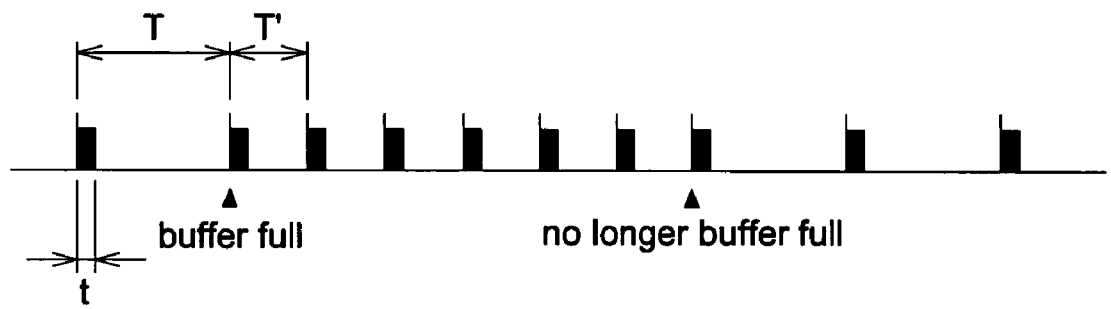
Figure 3C:
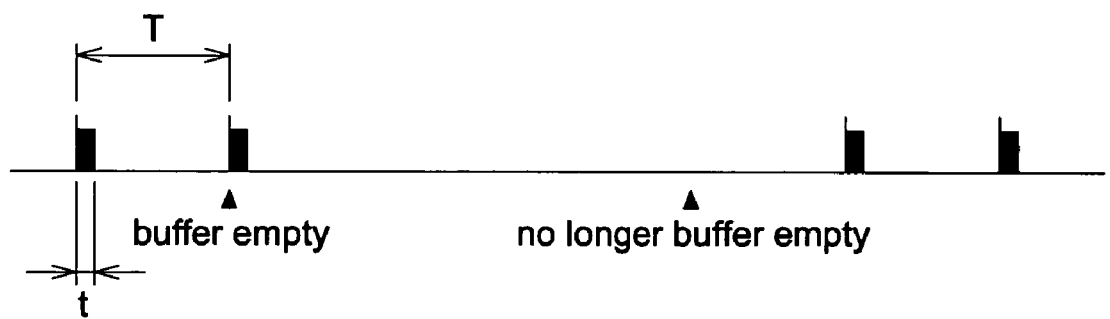

FIG. 3 is a timing chart illustrating the data process at the facsimile apparatus of FIG. 1. The packet transfer via the IP network is performed at a predetermined transfer rate that is standard for the VoIP communication system. When the data amount stored in jitter buffer 35 is in an ample state, i.e., between the upper and lower limit values, VoIP processor 12 and modem 23 performs the data process at a predetermined time interval T (e.g., 10 msec), as shown in FIG. 3(A).

When the data amount stored in jitter buffer 35 is in a buffer full state, exceeding the upper limit value, the operation timing of the output process by jitter buffer 35 and the data process by codec 31 and modem 23 is accelerated to a predetermined time interval T' (e.g., 5 msec), as shown in FIG. 3(B). Accordingly, the packet process is performed at a shorter interval than the interval of the packet arrival. Therefore, it is possible to quickly reduce the data amount stored in jitter buffer 35 and restores the buffer to the ample state, avoiding the overflow at jitter buffer 35.

When the data amount stored in jitter buffer 35 is in a buffer empty state, falling short of the lower limit value, the operation timing of the output process by jitter buffer 35 and the data process by codec 31 and modem 23 is decelerated. As shown in FIG. 3 (C), until the buffer empty state is resolved, the output process by jitter buffer 35 and the data process by codec 31 and modem 23 are temporarily halted. Accordingly, it is possible to quickly increase the data amount stored in jitter buffer 35 and restores the buffer to the ample state, avoiding the underflow at jitter buffer 35.

In this embodiment, an example is shown using a data communication apparatus (facsimile apparatus) with a built-in IP telephone adaptor apparatus, the data communication apparatus having transmitter/receiver 11, controller 14, RTP processor 33, jitter buffer processor 34, and codec 31. However, the IP telephone adaptor apparatus having the above components can be separated from the data communication apparatus and digitally connected to the data communication apparatus. Also, the data exchange between codec 31 and modem 23 can be performed by a serial transmission, in place of the digital pulse code modulation (PCM).

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2003-286357 filed on Aug. 5, 2003, entire content of which is expressly incorporated by reference herein.

What is claimed is:

1. A data communication apparatus that exchanges a voice packet via an IP network, the voice packet storing non-voice data, the apparatus comprising:
   a memory that stores data obtained from a received voice packet;
   a data processor that performs a predetermined process on the data, the data being sequentially output from the memory; and a controller that adjusts a data output rate at which the data is output from the memory and a data processing rate at which the predetermined process on the data is performed, according to a data amount within the memory.

2. The data communication apparatus according to claim 1,
wherein the data processor comprising:
a codec section that decodes the data; and
a modem that demodulates decoded data that is output from the codec section.

3. The data communication apparatus according to claim 2,
wherein the controller adjusts the data output rate using a standard clock that mutually synchronizes both the codec section and the modem.

4. The data communication apparatus according to claim 1, further comprising:
a detector that detects a state where the data amount stored in the memory exceeds a predetermined upper limit,
wherein the controller changes the data output rate and the data processing rate, when the detector detects the state.

5. The data communication apparatus according to claim 4,
wherein the upper limit is set based on a fluctuation of packet arrival intervals, the fluctuation being caused by a delay within the IP network.

6. The data communication apparatus according to claim 1, further comprising:
a detector that detects a state where the data amount stored in the memory falls short of a predetermined lower limit,
wherein the controller changes the data output rate and the data processing rate, when the detector detects the state.

7. The data communication apparatus according to claim 1,
wherein the data stored in the voice packet is facsimile data.

8. A data communication method for exchanging a voice packet via an IP network, the voice packet storing non-voice data, the method comprising:
storing data obtained from a received voice packet into a memory;
sequentially outputting the data from the memory and performing a predetermined process on the data using a data processor; and
adjusting a data output rate at which the data is output from the memory and a data processing rate at which the predetermined process is performed on the data using the data processor, according to a data amount within the memory.

9. The data communication method according to claim 8, further comprising:
detecting a state where the data amount stored in the memory exceeds a predetermined upper limit; and
changing the data output rate and the data processing rate when the state is detected.

10. The data communication method according to claim 8, further comprising:
detecting a state where the data amount stored in the memory falls short of a predetermined lower limit; and
changing the data output rate and the data processing rate when the state is detected.

* * * * *